United States Patent [19]

Tsukada et al.

[11] Patent Number: 4,955,697

[45] Date of Patent: Sep. 11, 1990

[54] LIQUID CRYSTAL DISPLAY DEVICE AND METHOD OF DRIVING THE SAME

[75] Inventors: Toshihisa Tsukada, Musashino; Yoshiyuki Kaneko, Kokubunji; Akira Sasano, Tokyo, all of Japan

[73] Assignee: Hitachi, Ltd., Tokyo, Japan

[21] Appl. No.: 183,141

[22] Filed: Apr. 19, 1988

[30] Foreign Application Priority Data

Apr. 20, 1987 [JP] Japan ................................ 62-95125

[51] Int. Cl.[5] .............................................. G02F 1/13
[52] U.S. Cl. ..................................... 350/332; 350/333; 350/334; 340/784
[58] Field of Search ...................... 350/332, 333, 334; 340/784, 805

[56] References Cited

U.S. PATENT DOCUMENTS

| | | | |
|---|---|---|---|
| 4,386,352 | 5/1983 | Nonomura et al. | 340/784 |
| 4,582,395 | 4/1986 | Morozumi | 350/334 |
| 4,717,244 | 1/1988 | Hilsum et al. | 350/333 |
| 4,778,560 | 10/1988 | Takeda et al. | 350/352 X |

FOREIGN PATENT DOCUMENTS

| | | | |
|---|---|---|---|
| 0119329 | 7/1984 | Japan | 350/332 |
| 119390 | 7/1984 | Japan . | |
| 0119526 | 5/1987 | Japan | 350/332 |
| 2067812 | 7/1981 | United Kingdom | 350/333 |
| 2096815 | 10/1982 | United Kingdom | 350/332 |
| 2133602 | 7/1984 | United Kingdom | 340/784 |

OTHER PUBLICATIONS

F. C. Luo, "Storage Capacitors in a TFT Addressed Liquid Crystal Display Panel", Xerox Disclosure Journal, vol. 4, No. 4 Jul./Aug. 1984 pp. 261-262.

Oki et al., "A New Active-Matrix LCD Architecture for Larger-Size Flat Displays" Proceedings of the SID, vol. 29, pp. 217-220, Mar. 1988.

Primary Examiner—Stanley D. Miller
Assistant Examiner—Huy K. Mai
Attorney, Agent, or Firm—Fay, Sharpe, Beall, Fagan, Minnich & McKee

[57] ABSTRACT

A liquid crystal display panel and a method of driving the display panel are disclosed. The display panel and the driving method can reduce the leakage of a gate driving voltage to a first pixel electrode due to the parasitic capacitance of a thin film transistor, and can lessen an adverse effect of noise which is generated at a second pixel electrode by cancelling out the capacitive coupling to the first pixel electrode, on an image displayed by the display panel.

8 Claims, 13 Drawing Sheets

(PRIOR ART)

FIG. IIA
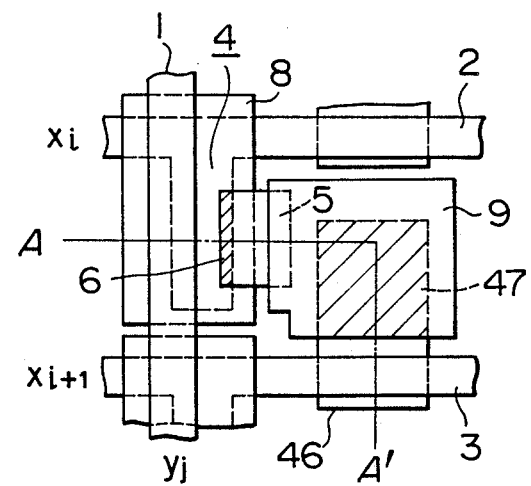
FIG. IIB
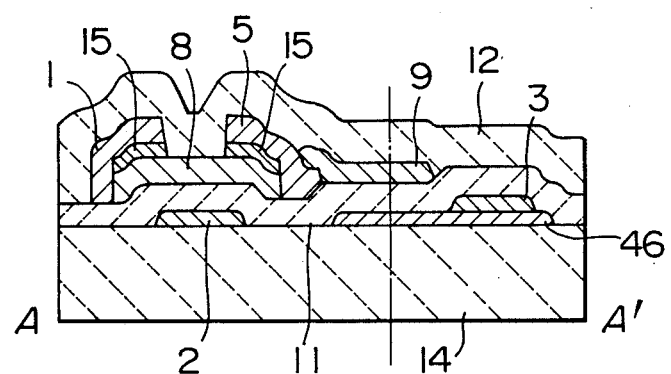

(PRIOR ART)

LIQUID CRYSTAL DISPLAY DEVICE AND METHOD OF DRIVING THE SAME

CROSS-REFERENCE TO RELATED APPLICATIONS

Co-pending U.S. patent application Ser. No. 183,620 based on Japanese Patent Applications Nos. 61-95127 and 62-95128 both filed on Apr. 20, 1987.

BACKGROUND OF THE INVENTION

The present invention relates to an active matrix type liquid crystal display panel and a method of driving the display panel.

In recent years, attention has been paid to a liquid crystal display panel which is driven by a thin film transistor (hereinafter simply referred to as "TFT"). A TFT matrix array for dividing the liquid crystal display panel generally has the following structure. That is, m gate lines and n data lines are arranged on a display screen so that the gate lines are perpendicular to the data lines, to divide the display screen into m×n display pixels. Each gate line is driven by a gate line drive circuit, and each data line is driven by a data line drive circuit. A TFT is provided at a position where a gate line and a data line face each other, and the switching function of the TFT is utilized to control the application of picture information to each pixel. Thus, a picture image is displayed on that region of a liquid crystal layer provided on the TFT matrix array which corresponds to the pixels, in accordance with the picture information.

In the above display panel, however, there arises a problem that, in a period when a TFT is kept at an OFF-state and picture information is held by a pixel corresponding to the TFT, a video signal indicating the picture information is degraded by the self-discharge in the liquid crystal layer and the leakage current at the TFT. In order to solve this problem, an additional storage capacitor is usually provided for each pixel. A method of forming the additional storage capacitor is described in an article (IEEE Transaction of Electron Devices, Vol. ED-20, No. 11, 1973, pages 995 to 1,001). In this method, the additional storage capacitor is formed between a pixel electrode and a gate line adjacent thereto.

Further, in a liquid crystal display panel driven by a TFT, there arises another problem that, owing to the parasitic capacitance $C_{gs}$ between the gate and source electrodes of the TFT, a gate voltage pulse capacitively couples to the pixel electrode voltage. Such a capacitive coupling the gate voltage pulse occurs as follows. Referring to FIG. 22, the parasitic gate-source capacitance ($C_{gs}$) 106 is annexed to a TFT 104. When a gate line voltage $V_g$ and a data line voltage $V_d$ each shown in FIG. 23 are applied to a gate line $x_i$ and a data line $y_i$ which are connected to the TFT104, respectively, a pulse voltage applied to the gate line $x_i$, leaks to the pixel electrode by an amount $\Delta V$ through the parasitic capacitance $C_{gs}$. Such a gate pulse voltage occurs in synchronism of the ON-OFF operation of the TFT. Specifically, a change in potential of the pixel electrode caused by the capacitive coupling the gate pulse voltage at a time the TFT is turned off, is kept for a long time. Thus, as shown in FIG. 24, the center potential $V_{sc}$ of the potential waveform $V_s$ of the pixel electrode deviates from the center potential $V_{dc}$ of the data line by an amount $\Delta V$. While, a potential $V_{com}$ shown in FIG. 24 is applied to an opposite electrode (namely, a transparent electrode opposite to the pixel electrode). Thus, a d.c. voltage equal to $|V_{com}-V_{sc}|$ is applied across the pixel. The generation of this d.c. voltage brings about the degradation of display characteristics, the degradation of alignment characteristics of liquid crystal and a reduction in life of the pixel electrode, thereby generating a non-uniform image, latent image and a flicker.

In order to solve this problem, the following method has been devised. That is, when a gate pulse is applied to a TFT connected to a gate line, a pulse opposite in polarity to the gate pulse is applied from the preceding gate line to a pixel electrode connected to the TFT, through an additional storage capacitor formed between the pixel electrode and the preceding gate line. This method is described in, for example, a Japanese Patent Application JP-A-59-119,390.

SUMMARY OF THE INVENTION

The present inventors have investigated the above method for reducing the capacitive coupling a gate voltage to a pixel electrode and have found that noise is introduced in a signal applied to another pixel electrode. In more detail, when the potential of a pixel electrode rises greatly, the potential of the preceding gate line which is connected to the pixel electrode through the additional storage capacitor, is increased towards a selection voltage. Accordingly, another TFT connected to the preceding gate line is erroneously turned on, though the TFT should be kept at an OFF-state. Thus, a false signal (that is, noise) is applied to a pixel driven by the preceding gate line on the basis of the erroneous ON-state of the above TFT, though the pixel should hold a signal correctly.

The present invention has been made in view of the above result of the investigation, and an object of the present invention is to provide a liquid crystal display panel and a method of driving the display panel capable of reducing capacitive coupling a gate voltage due to the parasitic capacitance of a TFT and lessening an adverse effect of noise which is generated at a pixel electrode by reducing the leakage of the gate voltage, on an image displayed by the display panel.

In order to attain the above object, according to the present invention, in synchronism with the generation of noise to a pixel electrode caused by cancelling capacitance coupling a gate voltage to another pixel electrode, a gate driving voltage waveform capable of reducing the noise is applied to the former pixel electrode.

In more detail, for example, a storage capacitor is formed between a portion of a pixel electrode driven by a TFT which is connected to a gate line, and a portion of the next gate line. Further, when a gate driving voltage applied to a gate line for driving a TFT is changed by an amount $v_1$ to turn off the TFT, a voltage change $(v_1+v_2)$ in a gate driving voltage applied to the next gate line is generated in a direction opposite to the direction of the voltage change $v_1$ (where $v_1>0$ and $v_2>0$).

It is preferred that the capacitor $C_{add}$ substantially satisfies the following equation:

$$C_{add}=(v_1/v_2)C_{gs} \qquad (1)$$

where $C_{gs}$ indicates the parasitic gate-source capacitance of the TFT.

BRIEF DESCRIPTION OF THE DRAWINGS

FIG. 11A is a plan view showing one pixel of a liquid crystal display panel according to a fifth embodiment of the present invention.

FIG. 11B is a sectional view taken along the line A—A' of FIG. 11A.

DESCRIPTION OF THE PREFERRED EMBODIMENTS

At first, explanation will be made of the generation of noise caused by reducing the leakage of a gate driving voltage and how to lessen an adverse effect of the noise.

Figure 1:
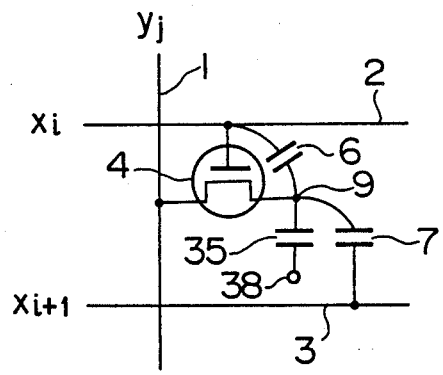
FIG. 1 is a circuit diagram showing an equivalent circuit for one pixel of a liquid crystal display panel according to a first embodiment of the present invention.
Figure 2:
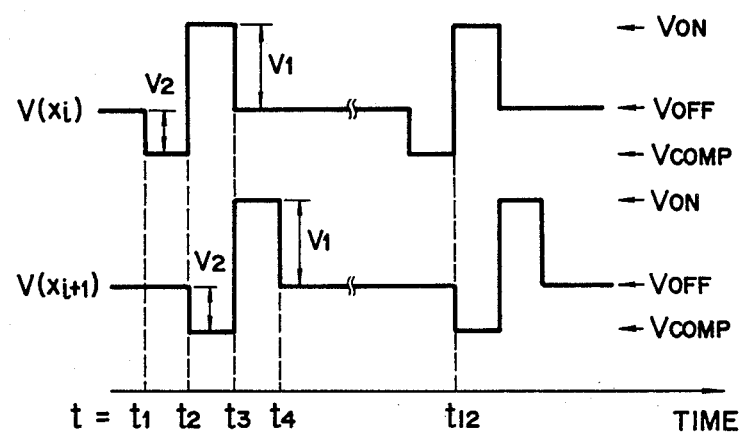
FIG. 2 is a waveform chart showing gate driving voltage waveforms applied to the circuit of FIG. 1.
Figure 3:
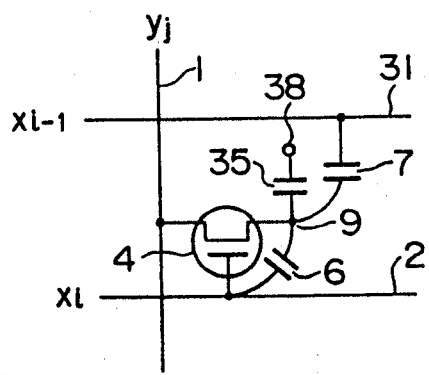
FIG. 3 is a circuit diagram showing an equivalent circuit for one pixel of a conventional liquid crystal display panel.

FIG. 1 shows an equivalent circuit for one pixel of a liquid crystal display panel according to a first embodiment of the present invention, and FIG. 3 shows an equivalent circuit for one pixel of a conventional liquid crystal display panel which has means for cancelling the capacitive coupling a gate driving voltage. Further, FIG. 2 shows gate driving voltage waveforms applied to the circuit of FIG. 1, and FIG. 4 shows gate driving voltage waveforms applied to the circuit of FIG. 3.

In FIG. 3, reference numeral 2 designates a gate line $x_i$, 31 the preceding gate line $x_{i-1}$, 4 a TFT, 6 the gate-source capacitance $C_{gs}$ of the TFT 4, 35 the equivalent capacitance of a liquid crystal layer, 9 a pixel electrode, 38 an opposite electrode, and 7 a capacitor formed between the preceding gate line 31 and the pixel electrode 9. Owing to the presence of the capacitor 7, a potential change at the pixel electrode 9 is propagated to the preceding gate line 31, at a time $t=t_6$ of FIG. 4. As has been previously mentioned, when the potential of the pixel electrode rises greatly, the potential of the preceding gate line changes in accordance with the potential change at the pixel electrode, and thus a TFT whose gate is connected to the preceding gate line is erroneously turned on, though the TFT should be kept at an OFF-state. Thus, noise is mixed with a video signal. The noise is generated immediately after the video signal has been written in the preceding pixel driven by the preceding gate line, and is held by the preceding pixel for a long time till the next selection voltage is applied to the preceding pixel. Thus, the picture quality of an image displayed by the display panel is degraded.

Figure 4:
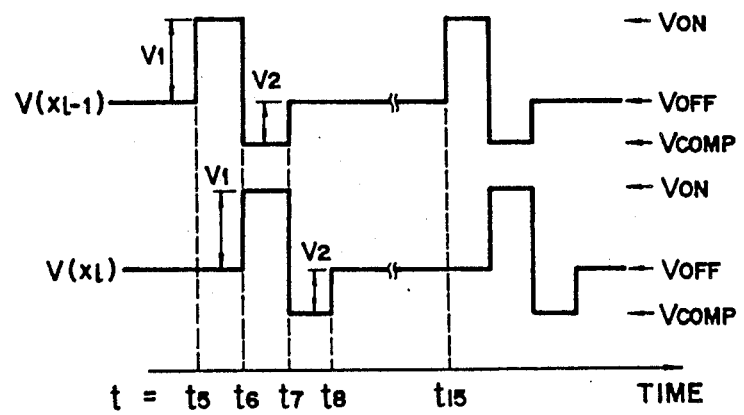
FIG. 4 is a waveform chart showing gate driving voltage waveforms applied to the circuit of FIG. 3.

Incidentally, reference symbols $v(x_i)$ and $v(x_{i-1})$ in FIG. 4 designate gate driving voltage waveforms applied to gate lines $x_i$ and $x_{i-1}$, respectively.

While, according to the present invention, for example, the circuit of FIG. 1 and the gate driving voltage waveforms of FIG. 2 are used. As shown in FIG. 1, an additional capacitor 7 is connected between a pixel electrode 9 and the next gate line $x_{i+1}$ (namely, the gate line 3). Incidentally, reference symbols $v(x_i)$ and $v(x_{i+1})$ in FIG. 2 designate gate driving voltage waveforms applied to gate lines $x_i$ and $x_{i+1}$, respectively.

A potential change at the pixel electrode 9 is propagated to the next gate line 3 through the capacitor 7, and thus a TFT whose gate is connected to the next gate line, is erroneously turned on to generate noise, as in the case where the circuit of FIG. 3 and the voltage waveforms of FIG. 4 are used. In the present invention using the circuit of FIG. 1 and the voltage waveforms of FIG. 2, however, the influence of the above noise on the picture quality can be made as small as possible, for the following reason.

Referring to FIG. 2, a potential change at the pixel electrode 9 is propagated to the next gate line $x_{i+1}$ (namely, the gate line 3) at a time $t=t_2$ when the gate driving voltage $v(x_i)$ applied to a gate line $x_i$ (namely, gate line 2) for driving the pixel electrode 9 rises abruptly. Now let us pay attention to the next gate line $x_{i+1}$. The gate driving voltage $v(x_{i+1})$ applied to the next gate line $x_{i+1}$ rises at a time $t=t_3$ so that the next gate line is put to a selection potential $V_{ON}$. Thus, even if noise is mixed with a video signal at the time $t=t_2$ on the basis of the propagation of the potential change, the next gate line $x_{i+1}$ is put to the selection potential $V_{ON}$ immediately after the time $t=t_2$ (namely, at the time $t=t_3$) to reduce the noise, and thus the influence of the noise on a displayed image can be minimized.

As has been previously mentioned, according to the conventional method, a potential change at a pixel electrode is propagated to the preceding gate line $x_{i-1}$ (namely, gate line 31) at the time $t=t_6$ shown in FIG. 4. Now, let us pay attention to the preceding gate line $x_{i-1}$. The preceding gate line $x_{i-1}$ having been affected by the propagation of the potential change will be put to a selection potential $V_{ON}$ after the selection of all other gate lines which usually include hundreds of gate lines, has been completed, that is, at a time $t=t_{15}$. Thus, the mixing of noise with a video signal generated at the time $t=t_6$ will not be eliminated for a long period till the time $t=t_{15}$.

As can be seen from the above, the present invention is very effective in minimizing the influence of noise generated by the propagation of a potential change, on a displayed image.

In the above, explanation has been made of a case where a voltage drop $v_1$ in gate driving voltage waveform $v(x_i)$ for turning off the TFT 4 and a voltage rise $v_1+v_2$ in gate driving voltage waveform $v(x_{i+1})$ given from the next gate line $x_{i+1}$ to the pixel electrode 9 through the additional capacitor 7, simultaneously occur at the time $t=t_3$. However, the present invention is not limited to this case. As will be explained in a tenth embodiment of the present invention, when the voltage rise $v_1+v_2$ in voltage waveform $v(x_{i+1})$ occurs a little after the voltage drop $v_1$ in voltage waveform $v(x_i)$, a voltage capacitively coupled to a pixel electrode can be reduced even more. It is especially preferable that the delay time (that is, the time interval between the above voltage rise and voltage drop) is about 3 percent of the selection time of the TFT. Further, it is necessary to make the delay time less than the selection time of the TFT.

Further, the difference between the gate driving voltage waveforms of FIG. 2 and those of FIG. 4 is determined only by which of the preceding gate line and the next gate line is connected to the additional capacitor. In a case where the additional capacitor is connected to the preceding gate line as shown in FIG. 3, it is preferred that the gate driving voltage first rises to the value $V_{ON}$ and then falls to a value $V_{COMP}$, as shown in FIG. 4. While, in a case where the additional capacitor is connected to the next gate line as shown in FIG. 1, it is preferred that the gate driving voltage first falls to the value $V_{COMP}$ and then rises to the value $V_{ON}$, as shown in FIG. 2. The reason for this is that a voltage capacitively coupled to a pixel electrode can be greatly cancelled.

In the above, the present invention has been explained by using the circuit of FIG. 1 and the gate driving voltage waveform of FIG. 2. However, the gist of the present invention resides in that a gate signal is applied to each gate line so that an adverse effect of noise which is generated by cancelling the capacitive coupling gate driving voltage to a pixel electrode, can be lessened. Accordingly, the present invention is not limited to the circuit configuration of FIG. 1 and the gate driving voltage waveform of FIG. 2.

Now, explanation will be made of some embodiments of the present invention.

Embodiment 1 (namely, first embodiment)

Figure 5:
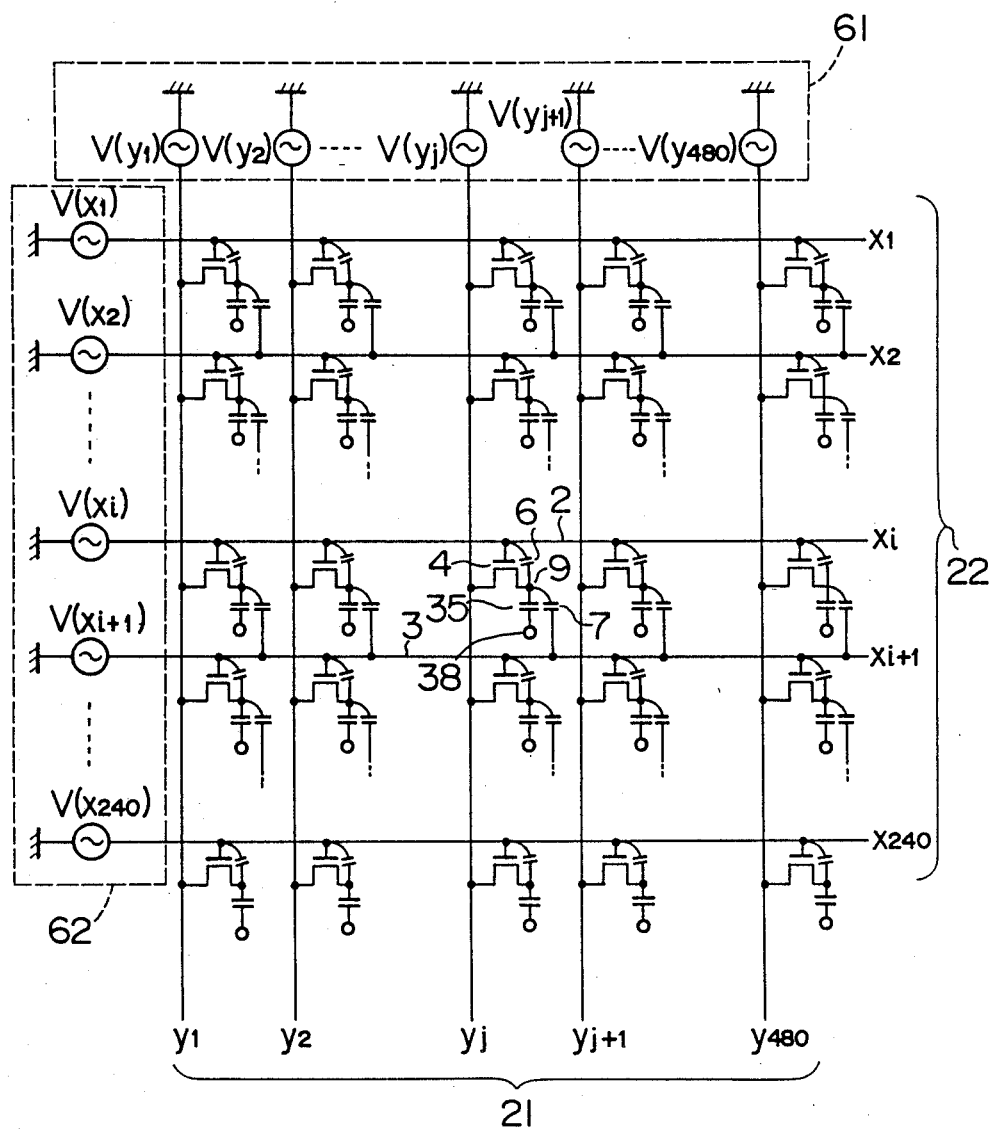
FIG. 5 is a circuit diagram showing the circuit configuration of a liquid crystal display panel according to the first embodiment of the present invention.

FIG. 5 shows the TFT matrix array of a liquid crystal display panel according to a first embodiment of the present invention. Referring to FIG. 5, 480 data lines 21 and 240 gate lines 22 are arranged so that the data lines are perpendicular to the gate lines. Further, each data line 21 is driven by a data line drive circuit 61, and each gate line 22 is driven by a gate line drive circuit 62. A TFT 4 is provided at a position where a data line 21 and a gate line 22 face each other, and an image portion is displayed in that region 35 of a liquid crystal layer which corresponds to one pixel, on the basis of the switching operation of the TFT. Incidentally, all of opposite electrodes (namely, electrodes opposite to pixel electrodes 9) 38 in the matrix array are kept at a common potential.

FIG. 1 shows the equivalent circuit of that portion of the above TFT matrix array which corresponds to one pixel, and FIG. 2 shows the gate driving voltage waveforms $v(x_i)$ and $v(x_{i+1})$ applied to the gate lines $x_i$ and $x_{i+1}$.

As shown in FIG. 1, the additional capacitor 7 is formed between the pixel electrode 9 and the (i+1)th gate line $x_{i+1}$. Further, as shown in FIG. 2, in synchronism with a voltage rise $v_1$ in gate driving voltage $v(x_i)$ at the time $t=t_3$ for turning on the TFT in the i-th row (that is, the change of gate voltage $v(x_i)$ from $V_{ON}$ to $V_{OFF}$), the gate driving voltage $v(x_{i+1})$ rises from $V_{COMP}$ to $V_{ON}$, that is, increases by an amount $(v_1+v_2)$, to turn on a TFT in the (i+1)th row.

Figure 6A:
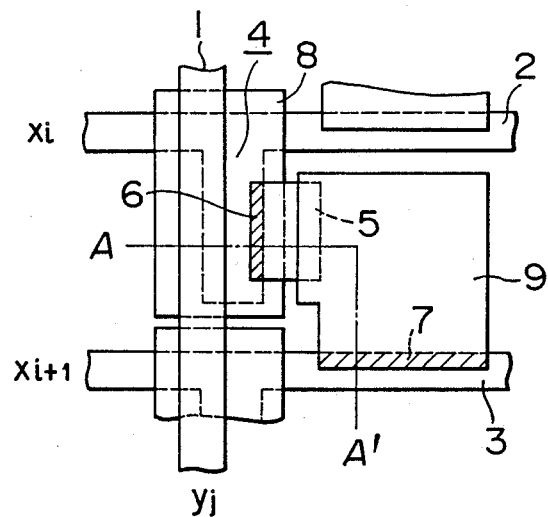
FIG. 6A is a plan view showing one pixel of the display panel of FIG. 5.
Figure 6B:
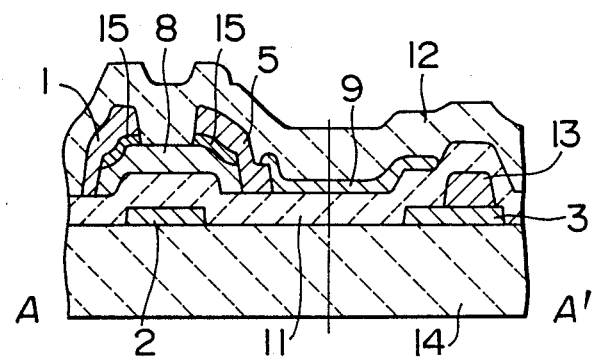
FIG. 6B is a sectional view taken along the line A—A' of FIG. 6A.

FIG. 6A is a plan view showing one pixel of the liquid crystal display panel according to the first embodiment, and FIG. 6B is a sectional view taken along the broken line A—A' of FIG. 6A.

In FIG. 6A, reference numeral 1 designates a data line, 2 the gate line $x_i$ connected to the gate electrode of a TFT for driving the present pixel, 3 the next gate line $x_{i+1}$, 4 the TFT for driving the present pixel, 5 the source electrode of the TFT 4, 6 a region where the gate-source capacitance $C_{gs}$ of the TFT 4 is produced, and 7 a region where the pixel electrode 9 and the next gate line 3 overlap each other to produce additional capacitor $C_{add}$ according to the present invention.

Next, the structure of the TFT 4 will be explained in detail, with reference to FIG. 6B. In FIG. 6B, reference numeral 8 designates an intrinsic amorphous silicon layer, 15 an n type amorphous silicon layer, 11 a gate insulating film made of silicon nitride, 12 a passivation layer for the TFT, 14 a glass substrate, and 13 a gate wiring pattern which is formed on the gate line 3 made of chromium and is made of aluminum. Usually, the gate wiring has a two-layer structure as mentioned above. However, the gate wiring is not limited to the two-layer structure, but may be formed of a single layer. Further, in FIG. 6B, not only the gate wiring but also the data line 1 and the source electrode 5 may have a two-layer structure. Incidentally, that part of the data line 1 which is kept in contact with the TFT 4 serves as the drain electrode of the TFT.

Next, explanation will be made of a method of driving the present liquid crystal display panel. As mentioned above, FIG. 1 shows an equivalent circuit for driving one pixel, and FIG. 2 is a timing chart of gate driving voltages $v(x_i)$ and $v(x_{i+1})$ applied to the gate lines 2 and 3. In the ordinary one-line-at-a-time scanning mode, the gate driving voltages $v(x_i)$ and $v(x_{i+1})$ are successively set to the selection voltage $V_{ON}$ for a short period, and are set to the non-selection voltage $V_{OFF}$ for the remaining period (where $V_{ON}-V_{OFF}=v_1>0$). In the method for driving the present liquid crystal display panel, each of the gate driving voltages $v(x_i)$ and $v(x_{i+1})$ is set not only to the selection voltage $V_{ON}$ and the non-selection voltage $V_{OFF}$ but also to a compensation voltage $V_{COMP}$. In more detail, in synchronism of the change of the gate driving voltage $v(x_i)$ to the selection voltage $V_{ON}$ at a time $t=t_2$, the gate driving voltage $v(x_{i+1})$ is set to the compensation voltage $V_{COMP}$ (where $V_{OFF}-V_{COMP}=v_2>0$).

In the present driving method, a selection time, during which a gate driving voltage is set to the selection voltage $V_{ON}$, for example, a time interval between the $t=t_2$ and the $t=t_3$ for the gate driving voltage $v(x_i)$ was made equal to 63μs, and a non-selection time between the end of a selection time and the beginning of the next selection time, for example, a time interval between the time $t=t_3$ and the time $t=t_{12}$ for the gate driving voltage $v(x_i)$ was made equal to 16 ms.

According to the present driving method, the capacitive coupling a gate voltage to a pixel electrode through parasitic capacitance $C_{gs}$ can be made equal to zero in the following manner.

The amount of capacitive coupling of the gate pulse to the pixel electrode voltage $\Delta V_3$ at the time $t=t_3$ of FIG. 2 and the amount of capacitive coupling of the gate pulse to the pixel electrode voltage $\Delta V_4$ at the time $t=t_4$ of FIG. 2 are given by the following equations:

$$\Delta V_3 = -(C_{gs}/C) \cdot v_1 + (C_{add}/C) \cdot (v_1+v_2)$$

$$\Delta V_4 = -(C_{add}/C) \cdot v_1$$

where C indicates $(C_{gs}+C_{Lc}+C_{add})$, and $C_{Lc}$ the equivalent capacitance of that portion of a liquid crystal layer which corresponds to one pixel.

Further, a d.c. voltage component applied to the pixel electrode is given by $(\Delta V_3+\Delta V_4)$, and is expressed as follows:

$$\Delta V_3+\Delta V_4 = -(C_{gs}/C)\cdot v_1 + (C_{add}/C)\cdot v_2 \quad (2)$$

Figure 7:
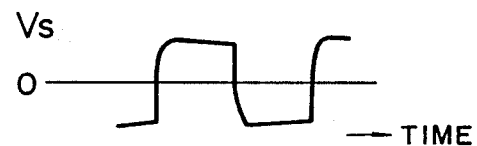
FIG. 7 is a waveform chart showing a voltage waveform which appears on a pixel electrode of the first embodiment.

When the capacitor $C_{add}$ is made equal to $(v_1/v_2)\cdot C_{gs}$, the right-hand side of the equation (2) becomes equal to zero, and thus the d.c. voltage component applied to the pixel electrode can be made equal to zero, independently of a video signal. In this case, the voltage applied to the pixel electrode 9 has such a waveform as shown in FIG. 7, and does not contain any d.c. component.

Further, according to the present driving method, the mixing of noise with a video signal caused by the propagation of the potential change of the pixel electrode, will produce substantially no adverse effect on a displayed image, for the reason having been previously mentioned. Now, the above fact in a case where the selection time and the non-selection time are made equal to 63μs and 16 ms, respectively, will be explained, by way of example. According to the prior art using the circuit of FIG. 3 and the gate driving voltage waveform of FIG. 4, a video signal mixed with noise is held by a pixel electrode for 16 milliseconds till the preceding gate line is again applied with the selection potential. While, according to the present driving method using the circuit of FIG. 1 and the gate driving voltage waveform of FIG. 2, a video signal mixed with noise is reduced at a time the next gate line is selected, that is, at a time when 63 microseconds have elapsed after the mixing of the noise with the video signal.

Next, explanation will be given of second to seventh embodiments with respect to modified versions of the electrode arrangement for producing the capacitor $C_{add}$.

Embodiment 2 (namely, second embodiment)

Figure 8:
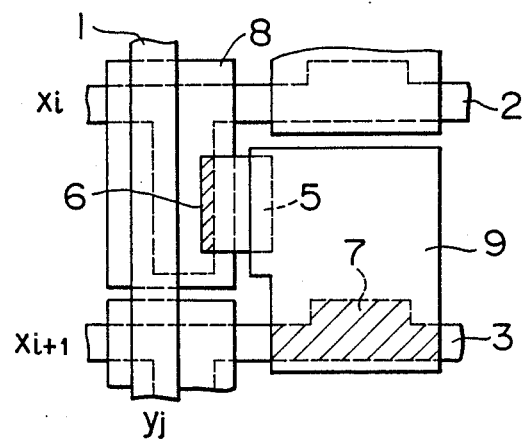
FIG. 8 is a plan view showing one pixel of a liquid crystal display panel according to the second embodiment of the present invention.

FIG. 8 is a plan view showing one pixel of a liquid crystal display panel according to a second embodiment of the present invention. In the present display panel, a region where the pixel electrode 9 and the next gate line 3 overlap each other to produce the capacitor $C_{add}$, is made larger in area than the similar region according to the first embodiment. That is, the capacitor $C_{add}$ of the present embodiment is larger than that of the first embodiment. Thus, in a case where the present display panel is driven in the same manner as in the first embodiment, the height $v_2$ of the pulse of reverse polarity can be made small.

Embodiment 3 (namely, third embodiment)

Figure 9:
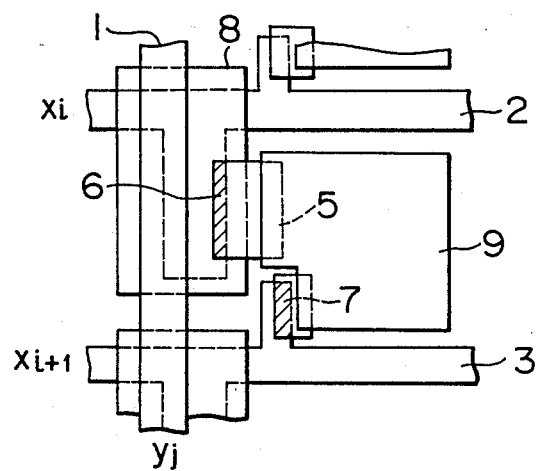
FIG. 9 is a plan view showing one pixel of a liquid crystal display panel according to a third embodiment of the present invention.

FIG. 9 is a plan view showing one pixel of a liquid crystal display panel according to a third embodiment of the present invention. In the present display panel, even when the position of the portion of the pixel electrode 9 is shifted rightward or leftward by variations in fabrication process, the parasitic capacitance $C_{gs}$ and the capacitor $C_{add}$ are both decreased (or increased Thus, the condition $C_{add}=(v_1/v_2)\cdot C_{gs}$ for making the d.c. voltage component applied to the pixel electrode equal to zero, will be scarcely affected by variations in fabrication process.

Embodiment 4 (namely, fourth embodiment)

Figure 10:
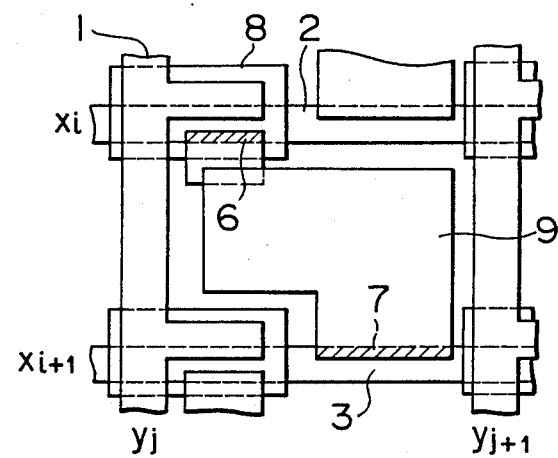
FIG. 10 is a plan view showing one pixel of a liquid crystal display panel according to a fourth embodiment of the present invention.

FIG. 10 is a plan view showing one pixel of a liquid crystal display panel according to a fourth embodiment of the present invention. In the present display panel, even when the position of the portion of the pixel electrode is shifted upward or downward, the capacitor $C_{gs}$ and the capacitor $C_{add}$ are both decreased (or increased). Thus, the present embodiment can produce the same effect as in the third embodiment.

Further, the kind and shape of each of the gate electrode, the source electrode, the drain electrode, the gate insulating film and the semiconductor layer are not limited to those used in the first to fourth embodiments. The present invention is independent of the structure of a TFT used, and is also independent of the deposition order among the pixel electrode, the source electrode, and the drain electrode. In the first to fourth embodiments, it is not always required to provide the passivation layer.

Further, it is not always required that the gate driving voltage waveforms $v(x_i)$ and $v(x_{i+1})$ have the phase relation shown in FIG. 2. For example, even if the pulse of reverse polarity is generated at a time which is shifted afterward a little from the time $t=t_2$, the advantage of the present invention will be substantially maintained.

Embodiment 5 (namely, fifth embodiment)

FIGS. 11A and 11B are diagrams for explaining a fifth embodiment of the present invention. In more detail, FIG. 11A is a plan view showing one pixel of a liquid crystal display panel according to the fifth embodiment, and FIG. 11B is a sectional view taken along the broken line A—A' of FIG. 11A. Reference numeral 47 in FIG. 11A designates a region where the pixel electrode 9 and a transparent electrode 46 kept in contact with the next gate line 3 overlap each other to produce the capacitor $C_{add}$. That is, in the present embodiment, the capacitor $C_{add}$ is produced between the pixel electrode and the transparent electrode kept in contact with the next gate line.

The display panel according to the present embodiment can be fabricated in the following manner.

At first, a transparent ITO (indium tin oxide) film is deposited on a glass substrate by the sputtering method, and then patterned through photo-etching techniques to form the transparent electrode 46. Then, chromium is deposited to a thickness of 1,000Å by the sputtering method, and then the chromium film thus obtained is patterned to form gate wiring 46. Then, an SiN film 11 serving as the gate insulating film and the insulating film for producing $C_{gs}$ and $C_{add}$, an intrinsic amorphous silicon layer and an n type amorphous silicon layer are successively formed by the plasma CVD method. The SiN film 11 is deposited at 250° C. and has a thickness of 3,000Å. The intrinsic amorphous silicon layer is deposited at 300° C. and has a thickness of 2,000Å. The n type amorphous silicon layer is deposited at 200° C. and has a thickness of 200Å. The source and drain electrodes of a TFT are deposited so as to have a two-layer structure formed of a chromium layer and an aluminum layer. After the SiN film 11, the amorphous silicon layers, and the source and drain electrodes have been patterned, another transparent ITO film is deposited, and then patterned to form the pixel electrode 9. Finally, an SiN film 12 for protecting the TFT is deposited by the plasma CVD method so as to have a thickness of 5,000Å.

In the present embodiment, the gate wiring is formed of the chromium layer. Alternatively, the gate wiring may be formed of an aluminum layer, or may have a two-layer structure including, for example, a chromium layer and an aluminum layer.

It is needless to say that when the display panel according to the present embodiment is applied with the gate driving voltage waveforms of FIG. 2, the same effect as in the first embodiment can be obtained.

Further, according to the present embodiment, the capacitor having a desired value can be readily produced in parallel with the liquid crystal layer of the display panel, without reducing the light transmitting area of each pixel, that is, without reducing the brightness of the display panel, and thus the discharging of signal voltage applied to the liquid crystal layer can be greatly reduced. Furthermore, the transparent electrode for generating the capacitor is kept in direct contact with the gate line, and hence a lead wire and a terminal for the transparent electrode are not required. Thus, inter-layer wiring is unnecessary, and there is not any fear of generating the fault due to inter-layer wiring. Further, in fact, no restriction is placed on the sheet resistance of the transparent electrode.

Embodiment 6 (namely, sixth embodiment)

Figure 12A:
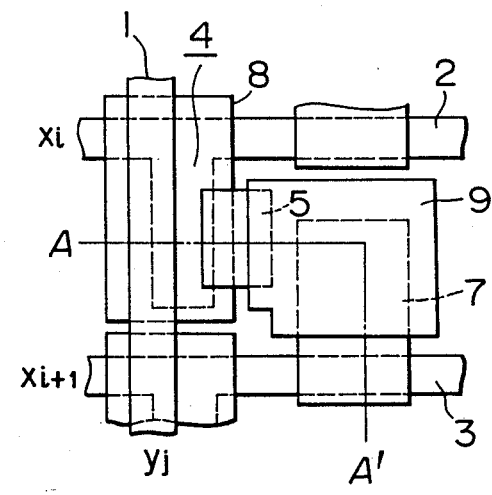
FIG. 12A is a plan view showing one pixel of a liquid crystal display panel according to a sixth embodiment of the present invention.
Figure 12B:
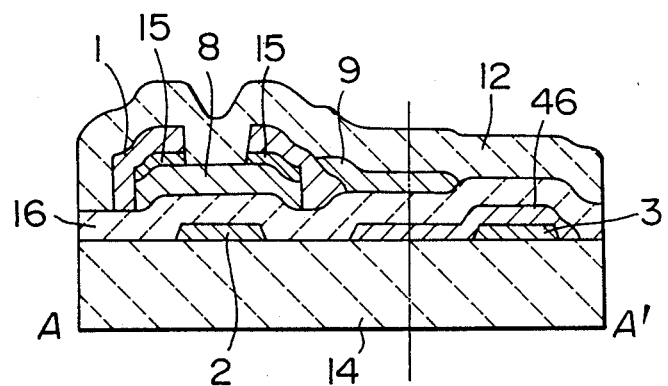
FIG. 12B is a sectional view taken along the line A—A' of FIG. 12A.

FIG. 12A is a plan view showing one pixel of a liquid crystal display panel according to a sixth embodiment of the present invention, and FIG. 12B is a sectional view taken along the broken line A—A' of FIG. 12A. The present embodiment is different from the fifth embodiment in that after the gate electrode 3 made of chromium has been formed, the transparent electrode 46 is deposited. In the present embodiment, an insulating film 16 is formed of an SOG (spin-on glass) layer, to simplify the fabrication process.

Embodiment 7 (namely, seventh embodiment)

Figure 13:
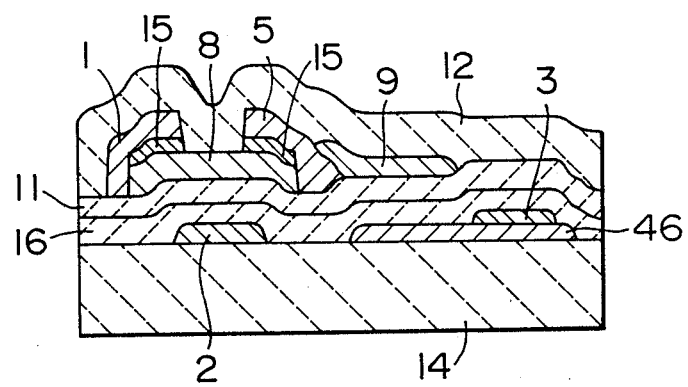
FIG. 13 is a sectional view showing one pixel of a liquid crystal display panel according to a seventh embodiment of the present invention.

FIG. 13 is a sectional view showing one pixel of a liquid crystal display panel according to a seventh embodiment of the present invention. Referring to FIG. 13, after the transparent electrode 46 used for the capacitor and the gate lines 2 and 3 have been deposited and shaped, the insulating SOG film 16 is formed so as to have a thickness of 1,000Å. The SOG film 16 is baked at 420° C. Then, the SiN film 11 is deposited on the SOG film 16 by the plasma CVD method. Thereafter, as in the fifth embodiment, the amorphous silicon layers are formed by the plasma CVD method. In the present embodiment, owing to the presence of the SOG film 16, the thickness of the SiN film 11 is made equal to 2,000Å.

In the present embodiment, the transparent electrode used for the capacitor $C_{add}$ is not kept in contact with the SiN film 11. Hence, severe conditions in depositing the SiN film 11 are eliminated, and moreover an excellent interface is formed between the SiN film and the amorphous silicon layer. Further, the insulating film has a two-layer structure, and hence the generation of pinhole in the insulating film can be suppressed.

The SOG film 16 may be replaced by, for example, an $SiO_2$ film deposited by the sputtering method.

Embodiment 8 (namely, eighth embodiment)

Figure 14:
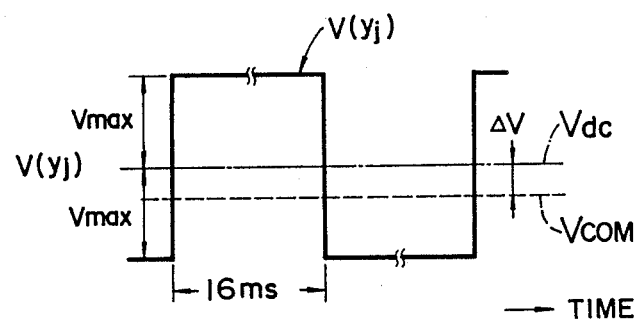
FIGS. 14 and 15 are waveform charts showing data line voltages which are used for explaining an eighth embodiment of the present invention.

A favorable gate driving voltage used in carrying out the inventive driving method which has been explained in the first embodiment, will be explained by an eighth embodiment of the present invention. FIG. 14 shows a voltage $v(y_i)$ applied to a data line $y_i$. As shown in FIG. 14, the polarity of the data signal voltage $v(y_i)$ is inverted at intervals of 16 ms so that the center voltage is set to $V_{dc}$. A maximum voltage (namely, voltage amplitude) $v_{max}$ shown in FIG. 14 is used at the whole display screen of a liquid crystal display panel, and the voltage waveform shown in FIG. 2 is applied to each gate line. Usually, the voltage change $v_1$ shown in FIG. 2 is so set as to satisfy the following relation:

$$v_1 \geq 2v_{max}$$

Accordingly, the center voltage $V_{dc}$ is put in a range from $V_{OFF} + \frac{1}{2}v + \frac{1}{2}(v_1 - 2v_{max})$ to $V_{OFF} + \frac{1}{2}v_1 - \frac{1}{2}(v_1 - 2v_{max})$. Strictly speaking, the center voltage $V_{dc}$ is so set as to satisfy the following relation:

$$V_{ON} - V_{dc} > v_{max} + v_t$$

where $v_t$ indicates the threshold voltage of the TFT. This relation is required for writing a video signal satisfactorily in the display panel.

Further, when a relation $V_{dc} - V_{OFF} > V_{max} + \alpha$ is satisfied, the video signal can be surely held by the display panel (where $\alpha$ is a margin for lessening an adverse effect due to the sub-threshold region of the TFT).

Figure 15:
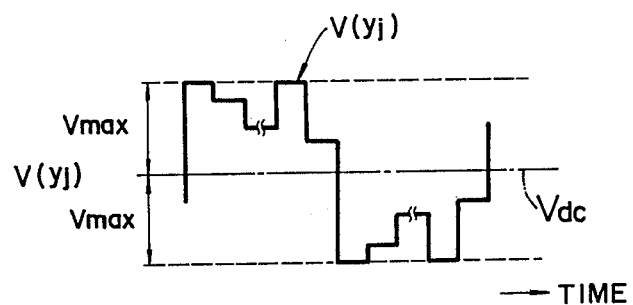

FIG. 15 shows another example of the data signal voltage waveform $v(y_i)$ applied to the data line $y_i$. In this case, an intermediate intensity signal can be applied to the liquid crystal display panel, and an image having various brightness values can be displayed on the display screen. It is needless to say that even in this case, it is desirable that the voltages $v_1$, $v_{max}$ and $V_{dc}$ satisfy the above relations. In a case where the gate driving voltage waveform of FIG. 2 is used and the above voltage relations are satisfied, the d.c. voltage $\Delta V = \Delta v_3 + \Delta v_4$ is generated at the pixel electrode. In a case where the capacitor $C_{add}$ is equal to zero, the d.c. voltage at the pixel electrode is caused by $\Delta v_3 = -(C_{gs}/C)v_1$. In a case where the capacitor $C_{add}$ is not equal to zero and the voltage $v_2$ is not equal to zero, the first and second terms of the right-hand side of the equation (2) cancel each other, so that the absolute value of the d.c. voltage $\Delta V$ is decreased.

In the above case, when the voltage $V_{COM}$ applied to the electrode opposite to the pixel electrode (namely, opposite electrode) is so set as to satisfy a relation $V_{COM} = V_{dc} + \Delta V$ (where $V_{dc}$ indicates the center voltage of the data signal voltage), a d.c. voltage applied between the pixel electrode and the opposite electrode becomes equal to zero. The d.c. voltage component $\Delta V$ at the pixel electrode due to the voltage capacitive coupling is preferably put in a range from $+2V$ to $-2V$. In order to improve the picture quality of a displayed image, it is necessary to put the d.c. voltage component $\Delta V$ in a range from $+1V$ to $-1V$.

Figure 16:
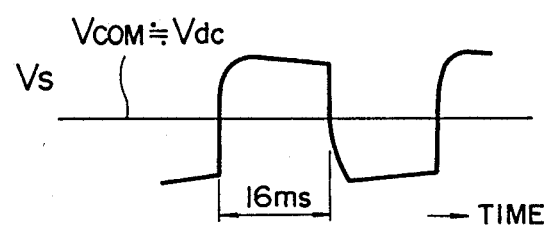
FIG. 16 is a waveform chart showing a voltage waveform which appears on a pixel electrode of the eighth embodiment.

When the relation $C_{add} = (v_1/v_2) \cdot C_{gs}$ is satisfied, the d.c. voltage $\Delta V$ become equal to zero, and hence the voltage $V_{COM}$ applied to the opposite electrode is made nearly equal to the center voltage $V_{dc}$ of the data signal voltage. That is, a very simple voltage condition $V_{COM} = V_{dc} + \alpha$ is obtained. By putting $\alpha$ in a range from $+2V$ to $-2V$, an optimum image can be obtained which is uniform in latent image and flicker. In this case, the potential $V_s$ of the pixel electrode 9 has an a.c. waveform shown in FIG 16, and the center value thereof is nearly equal to the voltage $V_{COM}$ applied to the opposite electrode 38.

Figure 17:
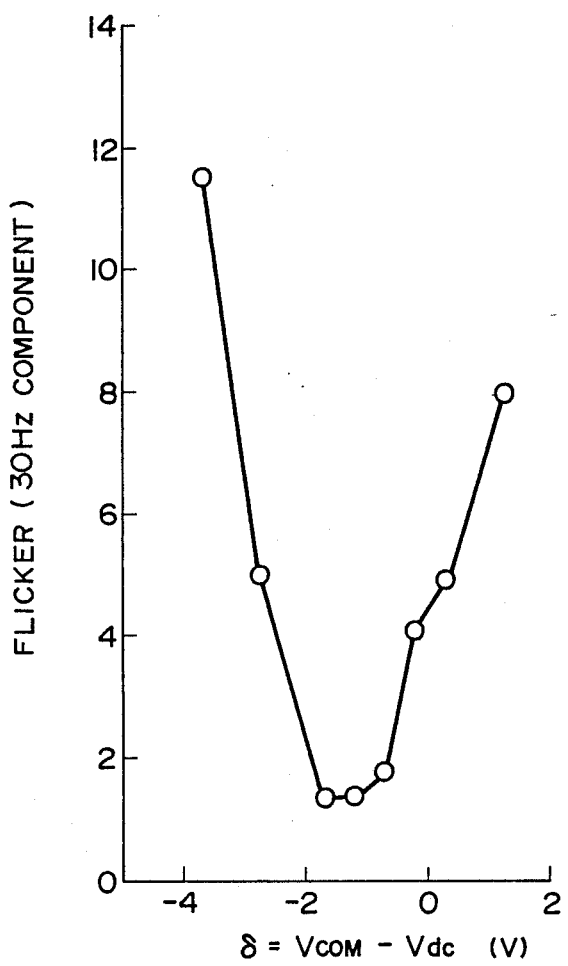
FIG. 17 is a graph showing a relationship in the eighth embodiment between a voltage difference δ and a flicker.
Figure 18:
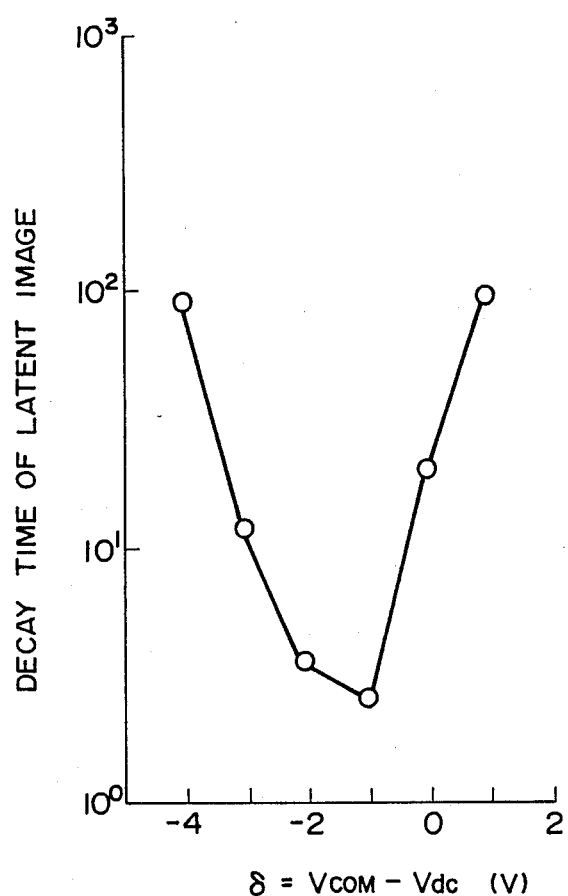
FIG. 18 is a graph showing a relationship in the eighth embodiment between a voltage difference δ* and decay time of latent image.

FIG. 17 shows the $\delta$ dependence of a flicker, and FIG. 18 shows the $\delta$ dependence of a decay time of the latent image. As is apparent from FIGS. 17 and 18, when the voltage difference $\delta = V_{COM} - V_{dc}$ lies in the vicinity of $-1V$, the flicker and decay time of the latent image are minimized.

Embodiment 9 (namely, ninth embodiment)

Figure 19:
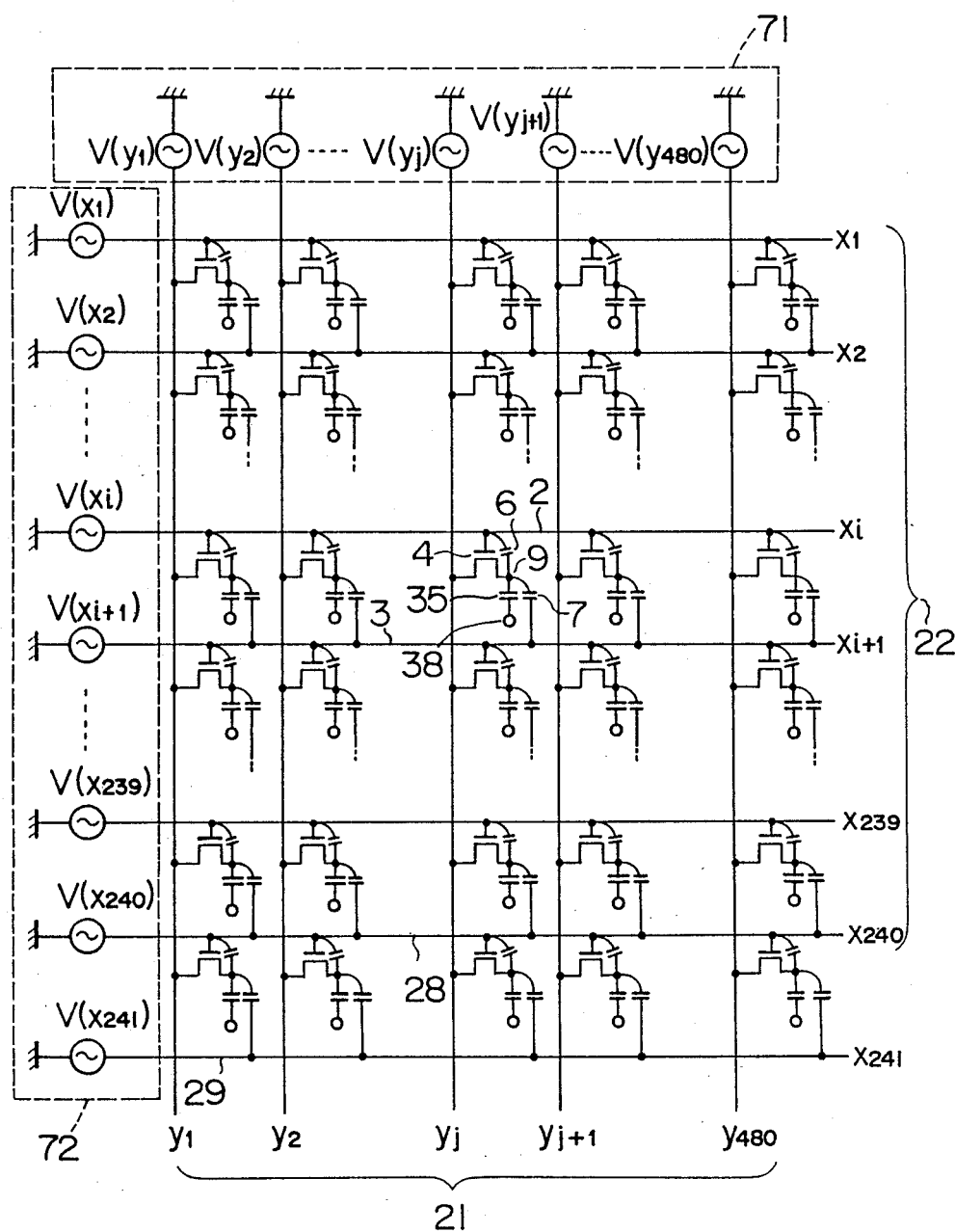
FIG. 19 is a circuit diagram showing the circuit configuration of a liquid crystal display panel according to a ninth embodiment of the present invention.

A ninth embodiment of the present invention will be explained, with reference to FIG. 19. FIG 19 is a circuit diagram showing the whole circuit configuration of a TFT matrix array used in the present embodiment. Like the TFT matrix array of the first embodiment shown in FIG. 5, the present array includes 240×480 pixels. However, the present embodiment is different from the first embodiment in that a single dummy gate line 29 is added to 240 gate lines. As shown in FIG. 19, one terminal of an additional capacitor 7 coupled with a pixel which is driven by the gate line $x_i$ (that is, gate line 2), is connected to the next gate line $x_{i+1}$ (that is, gate line 3), and one terminal of an additional capacitor, coupled with a pixel which is driven by the last gate line $x_{240}$ (namely, gate line 28), is connected to the dummy gate line 29. When the driving method in the first embodiment is carried out for a liquid crystal display panel according to the present embodiment, the capacitive coupling gate voltage to a pixel electrode is cancelled at the whole display area of the display panel, and thus an excellent image can be displayed. Although only one dummy gate line has been used in the above explanation, a plurality of dummy gate lines may be used. Further, the size of the TFT matrix array is not limited to the above-mentioned, but the matrix array may have a desired size.

Embodiment (b 10 (namely, tenth embodiment)

Figure 20:
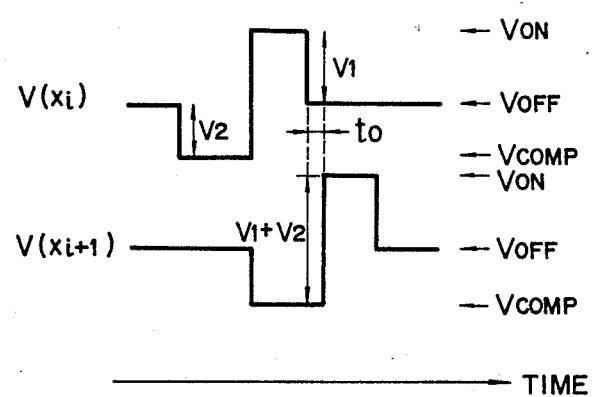
FIG. 20 is a waveform chart showing gate driving voltage waveforms which are used in a tenth embodiment of the present invention.
Figure 21:
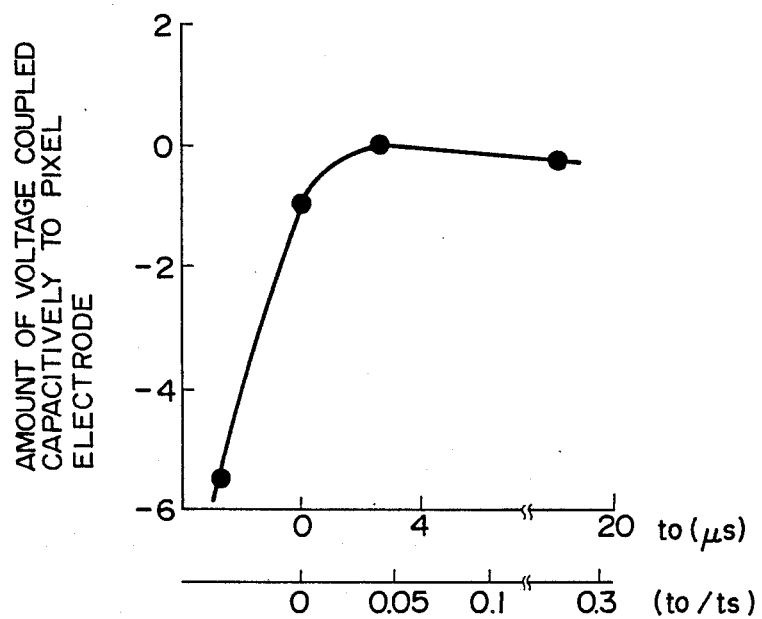
FIG. 21 is a graph showing a relationship in the tenth embodiment between a phase difference between gate driving voltages applied to adjacent gate lines, and an amount of voltage coupled capacitively to a pixel electrode.
Figure 22:
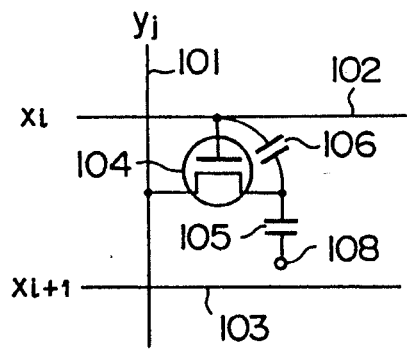
FIGS. 22, 23 and 24 are a circuit diagram and waveform charts for explaining the capacitive coupling a gate voltage in a conventional liquid crystal display panel.
Figure 23:
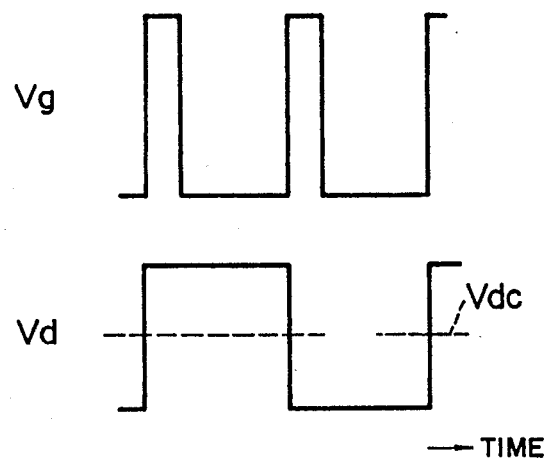
Figure 24:
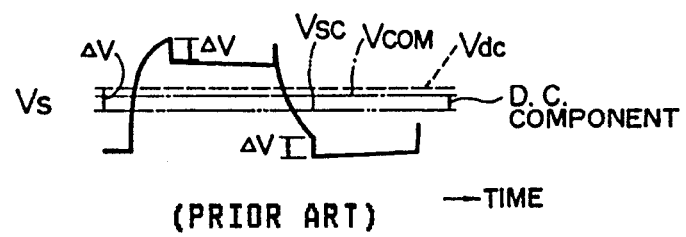

A tenth embodiment of the present invention relates to a phase relation between the gate driving voltage waveform $v(x_i)$ applied to the i-th gate line $x_i$ and the gate driving voltage waveform $v(x_{i+1})$ applied to the (i+1)th gate line $x_{i+1}$. FIG. 20 shows a modified version of the waveform chart of FIG. 2 for indicating the driving method of the present embodiment. In the present embodiment, also, the selection time $t_s$ and the non-selection time are set to 63⊖s and 16 ms, respectively. As shown in FIG. 20, the gate driving voltage $v(x_{i+1})$ rises by an amount $v_1 + v_2$ when a time $t_0$ has elapsed after the gate driving voltage $v(x_i)$ fell by an amount $v_1$ to turn off the TFT. Reason for this is as follows. When the voltage rise $v_1 + v_2$ in gate driving voltage $v(x_{i+1})$ is generated before the voltage drop $v_1$ in gate driving voltage $v(x_i)$, the compensation pulse is supplied from the next gate line to the pixel electrode through the capacitor $C_{add}$ at a time the TFT is turned on, and thus the voltage applied to the pixel electrode is immediately returned to the data signal voltage. FIG. 21 shows the $t_0$ dependence of the amount of voltage V coupled capacitively to the pixel electrode. As can be seen from FIG. 21, when the time interval $t_0$ is nearly equal to $2\mu s$, that is, a ratio $t_0/t_s$ is nearly equal to 0.03, the voltage V capacitively coupled to the pixel electrode becomes nearly equal to zero, and thus a favorable result can be obtained. The present invention is not limited to various numerical values used in the present embodiment. Specifically, the value of $t_0$ is dependent upon the time constant of each of the leading and falling edges of the gate pulse, and hence should be appropriately determined.

We claim:

1. A liquid crystal display panel comprising:
   a first substrate;
   a second substrate having a transparent conductive film thereon;
   a liquid crystal layer sandwiched between the first and the second substrates;
   a plurality of pixel electrodes formed on the first substrate and associated with respective intersections of parallel rows and parallel columns wherein the rows comprise a plurality of gate lines and the columns comprise a plurality of data lines;
   a plurality of thin film transistors formed on the first substrate for driving the pixel electrodes, respectively, each transistor having a gate connected to an associated gate line and two electrodes one of which is connected to one of the plurality of pixel electrodes and another electrode is connected to an associated data line;
   the plurality of gate lines being driven successively in a predetermined order for on-off control of the thin film transistors, each of the pixel electrodes in each one row being made to overlap the gate line in another row adjacent to the one row so as to provide capacitive coupling between the overlapping pixel electrode and the gate line; wherein the capacitive coupling between the overlapping pixel electrode and the gate line is represented by a capacitance $C_{add}$ which satisfies the following formula:

$$C_{add} = (V_1/V_2)C_{gs}$$

where $C_{gs}$ indicates a parasitic gate-source capacitance of the thin film transistor;

means for applying a driving voltage to each one of the plurality of gate lines, the driving voltage having a waveform which is at a voltage level $V_{ON}$ when the thin film transistors connected to said one gate line are to be ON-state, at a voltage level $V_{OFF}$ when said thin film transistors are to be OFF-state, and a voltage level $V_{COMP}$ just before said driving voltage goes up to the voltage level $V_{ON}$ and when the driving voltage applied to the precedingly driven gate line is at the voltage level $V_{ON}$, where $V_{ON} > V_{OFF} > V_{COMP}$.

2. A liquid crystal display panel comprising:
a first substrate;
a second substrate having a transparent conductive film thereon;
a liquid crystal layer sandwiched between the first and the second substrates;
a plurality of pixel electrodes formed on the first substrate and associated with respective intersections of parallel rows and parallel columns wherein the rows comprise a plurality of gate lines and the columns comprise a plurality of data lines;
a plurality of thin film transistors formed on the first substrate for driving the pixel electrodes, respectively, each transistor having a gate connected to an associated gate line and two electrodes, one of which is connected to one of the plurality of pixel electrodes and an other electrode is connected to an associated data line;
the plurality of gate lines being driven successively in a predetermined order for on-off control of the thin film transistors, each of the pixel electrodes in each one row being made to overlap the gate line which is to be driven after the gate line in another row adjacent to the one row so as to provide capacitive coupling between the overlapping pixel electrode and the gate line, wherein said capacitive coupling between the overlapping pixel electrode and the gate line is represented by a capacitance $C_{add}$ which satisfies the following formula:

$$C_{add} = (V_1/V_2) \cdot C_{gs}$$

where $C_{gs}$ indicates a parasitic gate-source capacitance of the thin film transistor; and, means for applying a driving voltage to each one of the plurality of gate lines, the driving voltage having a waveform which varies a voltage value $v_1$ at an off time when the thin film transistors controlled by that driving voltage are to be rendered off, and also varying a voltage value $(v_1 + v_2)$ in a direction opposite to that of the voltage $v_1$ at a time corresponding to the off time for the thin film transistors controlled by one of the gate lines driven preceding to that one gate line presently driven, where $v_1 > 0$ and $v_2 > 0$.

3. A liquid crystal display panel comprising:
a first substrate;
a second substrate having a transparent conductive film thereon;
a liquid crystal layer sandwiched between the first and the second substrates;
a plurality of pixel electrodes formed on the first substrate and associated with respective intersections of first to n-th parallel rows and parallel columns, where n is an integer and wherein the rows comprise a plurality of gate lines and the columns comprise a plurality of data lines;
a plurality of thin film transistors formed on the first substrate for driving the pixel electrodes, respectively, each transistor having a gate and two electrodes one of which is connected to one of the plurality of pixel electrodes and an other electrode is connected to an associated data line;
wherein the plurality of gate lines include a plurality of first to n-th gate lines formed on the first substrate corresponding to the first to the n-th rows of the pixel electrodes, respectively, each one of the plurality of gate lines, generally represented by (i-th) gate line where i is an integer satisfying $1 \leq i \leq n$, being connected to the gates of the thin film transistors associated with the pixel electrodes disposed in the i-th row and the gate lines being driven successively in an order of the first to the n-th gate line for on-off control of the thin film transistors connected to the gate lines, wherein each of the pixel electrodes disposed in the i-th row overlaps the $(i+1)$-th gate line so as to provide capacitive coupling between the overlapping pixel electrode and the gate line;
wherein said capacitive coupling between the overlapping pixel electrode and the gate line is represented by a capacitance $C_{add}$ which satisfies the following formula:

$$C_{add} = (V_1/V_2) \cdot C_{gs}$$

where $C_{gs}$ indicates a parasitic gate-source capacitance of the thin film transistor; and, means for applying to the $(i+1)$-th gate line a driving voltage having a waveform which varies a voltage value $v_1$ at an off time when the thin film transistors controlled by that driving voltage are to be turned off and also varies a voltage value $(v_1 + v_2)$ in a direction opposite to that of the voltage $v_1$ at a time corresponding to the off time for the thin film transistors controlled by the i-th gate line, where $v_1 > 0$ and $v_2 > 0$.

4. The liquid crystal display panel according to claim 3, wherein the voltage change $(v_1 + v_2)$ in the gate driving voltage applied to the $(i+1)$th gate line is generated substantially simultaneously with the voltage change $v_1$ in the gate driving voltage applied to the i-th gate line.

5. The liquid crystal display panel according to claim 3, wherein the voltage change $(v_1 + v_2)$ in the gate driving voltage applied to the $(i+1)$th gate line is generated at a time less than a predetermined time interval during which the thin film transistor is to be at ON-state after generation of the voltage change $v_1$ in the gate driving voltage applied to the i-th gate line.

6. A method of driving a liquid crystal display panel comprising a first substrate; a second substrate having a transparent conductive film thereon; a liquid crystal layer sandwiched between the first and the second substrates; a plurality of pixel electrodes formed on the first substrate and associated with respective intersections of first to n-th parallel rows and parallel columns, where n is an integer, and wherein the rows comprise a plurality of gate lines and the columns comprise a plurality of data lines; a plurality of thin film transistors formed on the first substrate for driving the pixel electrodes, respectively, each transistor having a gate and two electrodes one of which is connected to the associated pixel electrode; and an other electrode is connected to an associated data line; wherein the plurality of gate lines include a plurality of first to n-th gate lines formed on the first substrate corresponding to the first to the n-th rows, respectively, each gate line, generally represented by (i-th) gate line where i is an integer satisfying $1 \leq i \leq n$, being connected to the gates of the thin film transistors associated with the pixel electrodes disposed in the i-th row and the gate lines being driven successively in an order of the first to the n-th gate line for on-off control of the thin film transistors of which the gates are connected to the gate line as driven; each of the pixel electrodes disposed in the i-th row overlapping with the (i+1)-th gate line so as to provide capacitive coupling between the overlapping pixel electrode and the gate line, wherein said capacitive coupling between the overlapping pixel electrode and the gate line is represented by a capacitance $C_{add}$ which satisfies the following formula:

$$C_{add} = (V_1/V_2) \cdot C_{gs}$$

where $C_{gs}$ indicates a parasitic gate-source capacitance of the thin film transistor, said method comprising the steps of:

applying to the i-th gate line a first driving voltage which varies a voltage value $v_1$ at an off time for turning off the thin film transistors whose gates are connected to the i-th gate line; and applying to the (i+1)-th gate line a second driving voltage having a wave form which varies, at a time corresponding to the off time for the gate voltage applied to the i-th gate line a voltage value $(v_1 + v_2)$ in a direction opposite to that of the voltage $v_1$, where $v_1 > 0$ and $v_2 > 0$.

7. A method of driving a liquid crystal display panel, as claimed in claim 6, wherein the voltage change $(v_1 + v_2)$ in the gate driving voltage applied to the (i+1)th gate line is generated substantially simultaneously with the voltage change $v_1$ in the gate driving voltage applied to the i-th gate line.

8. A method of driving a liquid crystal display panel, as claimed in claim 6, wherein the voltage $(v_1 + v_2)$ in the gate line is generated at a time less than a predetermined time interval during which the thin film transistor is to be at ON-state after generation of the voltage change $v_1$, in the gate driving voltage applied to the i-th gate line.

* * * * *